March 19, 1929.  E. M. WAYLAND  1,706,368

UPEDGING MEANS FOR FRUIT SIZERS

Filed May 16, 1928

Inventor
E. M. Wayland

By Clarence A. O'Brien
Attorney

Patented Mar. 19, 1929.

1,706,368

UNITED STATES PATENT OFFICE.

EDWIN M. WAYLAND, OF COVESVILLE, VIRGINIA.

UPEDGING MEANS FOR FRUIT SIZERS.

Application filed May 16, 1928. Serial No. 278,189.

My contemporary application for patent filed November 2, 1927, Serial No. 230,555, which eventuated in Patent No. 1,696,056, dated December 18, 1928, discloses upedging means for fruit sizers.

In common with the invention of said prior application, the object of my present invention is to increase the efficiency and accuracy of fruit sizing apparatus by the provision of upedging means for developing friction between non-spherical fruit elements, as apples, and tangerines, and a sizing belt through the application of pressure or frictional contact to an apple or tangerine from above so as to bring about spinning of the apple or tangerine, as distinguished from "flat riding," and to present the apple or tangerine to the best advantage to the kicker wheels or other gaging or ejecting means so as to assure gaging and ejection on the maximum diameter of the apple or tangerine transverse to the core thereof.

To the attainment of the foregoing, the present invention consists in the improvement as hereinafter described and definitely claimed.

In the accompanying drawings forming part of this specification:

Figure 3 is a view similar to Figure 1 illustrative of the modification hereinafter explicitly referred to.

Figure 1:
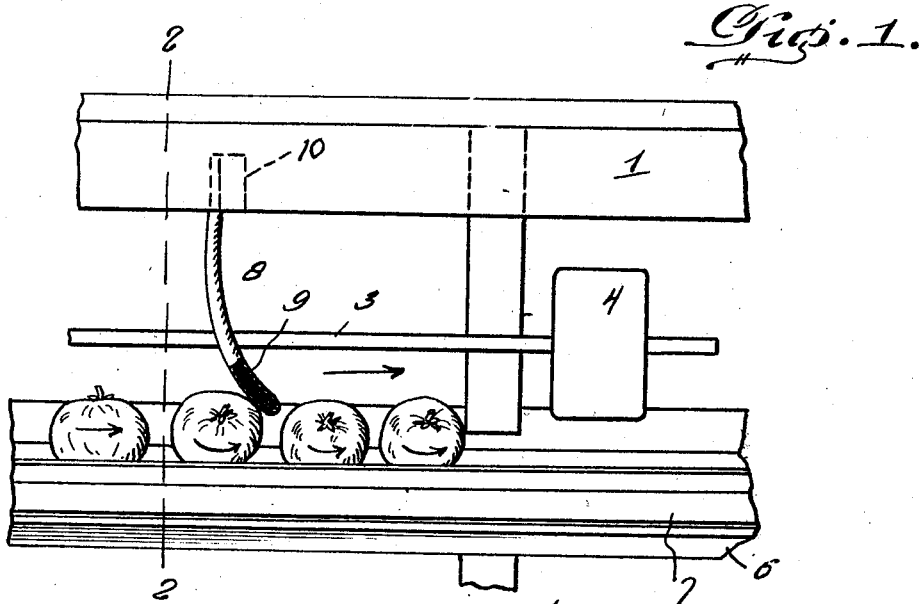
Figure 1 is a view in side elevation showing a portion of a fruit sizer, designed more especially for sizing apples, and equipped with my invention.

Similar numerals designate corresponding parts in Figures 1 and 2 of the drawings to which reference will first be made.

Among other elements, the illustrated embodiment of my invention comprises a longitudinal overhead frame portion 1, and a longitudinal trough 2, the sides of which latter may be equally inclined, as illustrated, or may be unequally inclined, in the discretion of the manufacturer and without affecting my invention.

Said apparatus also comprises a longitudinal shaft 3 with kicker wheels 4 thereon, at spaced intervals in the length thereof, but in this connection I would have it distinctly understood that within the purview of the present invention any appropriate gaging and ejecting means may be employed without departure from the invention. A sizing belt 5 is employed on one side of the trough 2, and from the said side of the trough 2 extends an inclined deck 6 on which is a distributing belt 7. The sizing belt 5 and the distributing belt 7 are in practice driven in the direction indicated by the large arrow in Figure 1. In furtherance of the invention disclosed herein I employ gravitational upedgers which are arranged as shown in Figure 1 so as to engage the apples or other fruit elements before the apples or other fruit elements reach the gaging and ejecting means 4.

In the present invention the upedgers are in the form of gravitational flexible bags 8, the lower portions of which contain heavy material designated by 9 so that the bags 8 may be properly described as having lower weighted portions. At their upper ends, the flexible bags 8 which are preferably of canvas are connected to transverse bars 10, as indicated by 11, Figure 2. The said bars 10 are attached to the longitudinal frame portion as shown.

It will be noted that the upedgers 8 are free to swing or oscillate on the transverse bars 10, and while I show the upedgers as capable of vertical oscillation or swinging, I do not desire to be understood as limiting myself to vertical oscillation or swinging inasmuch as the upedgers in some instances may be made to oscillate off the vertical without materially affecting the efficiency of the upedgers.

As their designation imports, the upedgers 8 are designed to engage and frictionally contact with and bear on apples approaching the gaging and ejecting means 4 so as to give rise to spinning of the apples so that assuredly the gaging and ejection of the apples by the means 4 will be on the maximum diameters of the apples, tranverse to the cores thereof.

It is desirable to feed apples from a hopper to the sizing belt 5 at one end of the apparatus, this because it is cheap and gives rise to high capacity. The mode of feeding alluded to is, however, objectionable because the initial velocity of the apples as they reach the sizing belt is too high and results in flat riding of the apples. My upedging means develops friction between the apples and the sizing belt 4 by the application of pressure to the apples from above, or from a point opposite to the sizing belt 5, with the result that the apples are caused to spin and consequently will be presented to the gaging and ejecting means in such fashion that gaging and ejection on the maximum diameter of the apple—i. e., transverse to the cores thereof, will be assured.

It will be appreciated from the foregoing that by serving the purpose ascribed to them, the upedgers will obviate the necessity of employing costly and cumbersome feed belts for the side feeds; and it will also be appreciated that the provision of upedging means as 8 in the relation defined will materially enhance the efficiency and accuracy of the sizing apparatus, when non-spherical fruit elements such as apples are sized.

Figure 2:
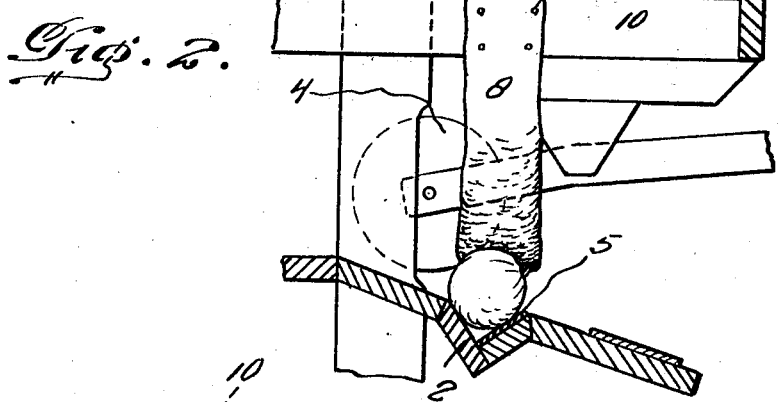
Figure 2 is a transverse section taken on the plane indicated by the line 2—2 of Figure 1, looking toward the right.
Figure 3:
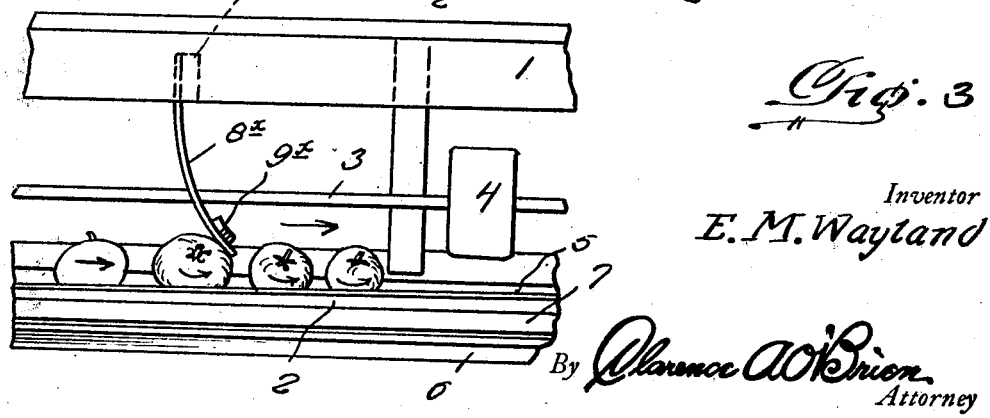

In the modification illustrated in Figure 3, the upedger $8^x$, attached to the transverse bar 10, is in the form of a flexible strip of belting or other appropriate material, and the lower portion of the said belting strips or flexible strips is weighted as designated by $9^x$, the weight being in the form of a disc or in any other appropriate form, and of any appropriate material, and being disposed at the opposite sides of the flexible strip $8^x$ with reference to the sides thereof that is opposed to apples moved on the sizing belt 5 in the direction of the large arrow in Figure 3. The upedger $8^x$ is for the same purpose and is designed to operate in identically the same manner as the upedger 8 of Figures 1 and 2.

In the type of sizing apparatus disclosed, the shaft 3 is provided with kicker wheels 4 at spaced intervals in the length of the shaft, and it will be understood that one of my novel upedgers will be employed in association with each of the kicker wheels 4, each upedger 8 being arranged to encounter apples before the apples reach the kicker wheels 4, complementary to said upedger as is clearly brought out in Figures 1 and 3.

While I prefer the specific embodiment illustrated I do not desire to be understood as limiting myself to the same, my invention being defined by my appended claims within the scope of which modifications may be made without departure from my invention.

I would also have it understood that while as hereinbefore indicated my improvement is designed more particularly for handling apples and tangerines, the improvement may be used to advantage in the sizing of other non-spherical fruit elements.

Having thus described the invention, what I claim as new and desire to secure by Letters Patent is:—

1. In a fruit sizer, the combination of a trough, spaced gaging and ejecting means, a sizing belt, and gravitational means for bearing on and frictionally engaging apples and other fruit elements on the sizing belt before such elements reach the gaging and ejecting means; the said gravitational means being in the form of a flexible device suspended from overhead means.

2. In a fruit sizer, the combination of a trough, spaced gaging and ejecting means, a sizing belt, and gravitational means for bearing on and frictionally engaging apples and other fruit elements on the sizing belt before such elements reach the gaging and ejecting means, the said gravitational means being in the form of a flexible device suspended from overhead means, and having a lower weighted portion arranged to wipe over fruit elements.

3. In a fruit sizer, the combination of a trough, spaced gaging and ejecting means, a sizing belt, and gravitational means for bearing on and frictionally engaging apples and other fruit elements on the sizing belt before such elements reach the gaging and ejecting means; the said gravitational means being in the form of a flexible device suspended from overhead means, there being one of said gravitational means to each gaging and ejecting means.

4. In a fruit sizer, the combination of a trough, spaced gaging and ejecting means, a sizing belt, and gravitational means for bearing on and frictionally engaging apples and other fruit elements on the sizing belt before such elements reach the gaging and ejecting means; the said gravitational means being in the form of a flexible device suspended from overhead means, and having a lower weighted portion, there being one of said gravitational means to each gaging and ejecting means.

5. In a fruit sizer, the combination of a trough, spaced gaging and ejecting means, a sizing belt, and gravitational flexible devices suspended from above for bearing on and frictionally engaging apples and other fruit elements before such elements reach the gaging and ejecting means.

6. In a fruit sizer, the combination of a trough, spaced gaging and ejecting means, a sizing belt, and gravitational flexible devices suspended from above for bearing on and frictionally engaging apples and other fruit elements before such elements reach the gaging and ejecting means, there being one of said devices to each gaging and ejecting means.

7. In a fruit sizer, the combination of a trough, spaced gaging and ejecting means, a sizing belt, and gravitational flexible devices suspended from above for bearing on and frictionally engaging apples and other fruit elements before such elements reach the gaging and ejecting means, and having lower weighted portions.

8. In a fruit sizer, the combination of a trough, spaced gaging and ejecting means, a sizing belt, and gravitational flexible devices suspended from above for bearing on and frictionally engaging apples and other fruit elements before such elements reach the gaging and ejecting means, and having lower weighted portions, there being one of said devices to each gaging and ejecting means.

9. In a fruit sizer, the combination of a trough, spaced gaging and ejecting discs, and gravitational flexible devices for bearing on and frictionally engaging apples and other fruit elements on the sizing belt before such elements reach the gaging and ejecting discs.

10. In a fruit sizer, the combination of a trough, spaced gaging and ejecting discs, and gravitational flexible devices for bearing on and frictionally engaging apples and other fruit elements on the sizing belt before such elements reach the gaging and ejecting discs, there being one of said gravitational flexible devices to each gaging and ejecting disc.

11. In a fruit sizer, the combination of spaced gaging and ejecting means, means for moving apples and other fruit elements below said spaced gaging and ejecting means, and flexible suspended devices, one to each gaging and ejecting means, for wiping over and upedging apples and other fruit elements and bringing about spinning of apples and other fruit elements and assuring gaging and ejection of the apples and other fruit elements on the maximum diameters thereof.

12. In a fruit sizer, the combination of spaced gaging and ejecting means, means for moving apples and other fruit elements below said spaced gaging and ejecting means, and flexible suspended devices, one for each gaging and ejecting means, for wiping over and upedging apples and other fruit elements and bringing about spinning of apples and other fruit elements and assuring gaging and ejection of the apples and other fruit elements on the maximum diameters thereof, said devices having lower weighted portions to engage fruit elements.

13. In a fruit sizer, the combination of spaced gaging and ejecting means, means for moving apples and other fruit elements below said spaced gaging and ejecting means, and flexible, oscillatory, weighted devices, one to each gaging and ejecting means, for upedging apples and other fruit elements, and bringing about spinning of apples and other fruit elements and assuring gaging and ejection of the apples and other fruit elements on the maximum diameters thereof, said devices being in the form of bags with heavy material in the lower portions thereof.

14. In a fruit sizer, the combination of spaced gaging and ejecting means, means for moving apples and other fruit elements below said spaced gaging and ejecting means, and suspended gravitational oscillatory devices, one to each gaging and ejecting means, for upedging apples and other fruit elements, and bringing about spinning of apples and other fruit elements and assuring gaging and ejection of apples and other fruit elements on the maximum diameters thereof, each of said devices being in the form of a flexible strip of material, the lower portion of which is provided on its side opposite the fruit element's engaging side with a weight.

15. In a fruit sizer, the combination of a trough, a sizing belt, spaced gaging and ejecting means, a longitudinal portion located in a plane above that of the trough and sizing belt, transverse supports carried by said portion and located above the trough and sizing belt and spaced apart, and gravitational oscillatory flexible upedgers connected with and pendent from said supports and having comparatively heavy forward portions to wipe over fruit elements.

In testimony whereof I affix my signature.

EDWIN M. WAYLAND.